(12) United States Patent
Goto et al.

(10) Patent No.: US 11,479,645 B2
(45) Date of Patent: Oct. 25, 2022

(54) RESIN MOLDED ARTICLE FOR SEAL

(71) Applicant: TOKAI KOGYO CO., LTD., Obu (JP)

(72) Inventors: Yoshinori Goto, Obu (JP); Yasuhiro Hirata, Obu (JP)

(73) Assignee: TOKAI KOGYO CO., LTD., Obu (JP)

( * ) Notice: Subject to any disclaimer, the term of this patent is extended or adjusted under 35 U.S.C. 154(b) by 662 days.

(21) Appl. No.: 16/484,146

(22) PCT Filed: Feb. 9, 2018

(86) PCT No.: PCT/JP2018/004553
§ 371 (c)(1),
(2) Date: Aug. 7, 2019

(87) PCT Pub. No.: WO2018/151032
PCT Pub. Date: Aug. 23, 2018

(65) Prior Publication Data
US 2019/0390021 A1  Dec. 26, 2019

(30) Foreign Application Priority Data

Feb. 14, 2017  (JP) .............................. JP2017-024992

(51) Int. Cl.
*C08J 3/24* (2006.01)
*C08J 5/00* (2006.01)
(Continued)

(52) U.S. Cl.
CPC . *C08J 3/24* (2013.01); *C08J 5/00* (2013.01); *C08L 23/00* (2013.01); *C08L 53/00* (2013.01); *F16J 15/10* (2013.01); *C08L 2203/30* (2013.01)

(58) Field of Classification Search
CPC ................ C08F 297/08; C08F 297/083; C08F 297/086; C08J 5/00; C08J 3/24; C08L 23/00; C08L 23/23; C08L 53/00
See application file for complete search history.

(56) References Cited

U.S. PATENT DOCUMENTS

2009/0137741 A1* 5/2009 Natsuyama ............. C08L 23/06
525/194
2015/0119817 A1  4/2015 Prasad et al.
(Continued)

FOREIGN PATENT DOCUMENTS

CN  104854713 A  8/2015
CN  105813672 A  7/2016
(Continued)

OTHER PUBLICATIONS

Nov. 18, 2020 Extended Search Report issued in European Patent Application No. 18754921.7.
(Continued)

*Primary Examiner* — Mark S Kaucher
(74) *Attorney, Agent, or Firm* — Oliff PLC

(57) ABSTRACT

The resin molded article includes a main body part configured to be mounted to a car body panel, a cantilever-shaped seal part for sealing a gap in the car body panel, and a hollow tubular-shaped seal part. The seal part is in resilient contact with the car body panel in a state of being mounted to the car body panel. The seal part is molded from a thermoplastic elastomer containing 25 wt % or more of an olefin block copolymer. It is preferable that the thermoplastic elastomer also contains a dynamically crosslinked olefin-based elastomer in addition to the olefin block copolymer.

2 Claims, 5 Drawing Sheets

(51) Int. Cl.
*C08L 23/00* (2006.01)
*C08L 53/00* (2006.01)
*F16J 15/10* (2006.01)

(56) References Cited

U.S. PATENT DOCUMENTS

| | | |
|---|---|---|
| 2015/0287856 A1 | 10/2015 | Kauffman et al. |
| 2020/0129703 A1 | 4/2020 | Prasad et al. |

FOREIGN PATENT DOCUMENTS

| | | |
|---|---|---|
| EP | 2613361 A1 | 7/2013 |
| JP | 2005-171190 A | 6/2005 |
| JP | 2007-297503 A | 11/2007 |
| JP | 2010-126655 A | 6/2010 |
| JP | 2014-177163 A | 9/2014 |
| JP | 2015-166470 A | 9/2015 |
| JP | 2016-068573 A | 5/2016 |
| JP | 2016-074824 A | 5/2016 |
| JP | 2016-182864 A | 10/2016 |
| WO | 2015/195322 A1 | 12/2015 |

OTHER PUBLICATIONS

Apr. 3, 2018 International Search Report issued in International Patent Application No. PCT/JP2018/004553.

Apr. 3, 2018 Written Opinion of International Patent Application No. PCT/JP2018/004553.

Apr. 2, 2021 Office Action issued in Chinese Patent Application No. 201880011995.8.

Jun. 2, 2021 Office Action issued in Japanese Patent Application No. 2017-024992.

* cited by examiner

RESIN MOLDED ARTICLE FOR SEAL

TECHNICAL FIELD

The present invention is related to a resin molded article including a main body part configured to be mounted to a mounted member and at least one seal part.

BACKGROUND ART

Various structures, machine products, etc. are sometimes required to satisfy the liquid tightness, airtightness, sound insulation, dust resistance, etc. of a gap among members constituting the structure, machine product, etc. In this case, it is a common practice to interpose a seal member so as to seal the gap.

Such a seal member includes, for example, a seal member of JP-A-2005-171190. The seal member of JP-A-2005-171190 is a molding for an automobile including a main body part mounted to a mounted member and at least one seal part. This molding is molded in its entirety from an olefin-based thermoplastic elastomer composition containing from 5 to 50 parts by weight of a high-density polyethylene (A) including substantially no comonomer, and from 50 to 95 parts by weight of an ethylene.α-olefin-based copolymer (B) having a Mooney viscosity ML 1+4 (100° C.) of 90 to 250 and an ethylene content of 60 to 95 mol %. It is supposed that due to such a configuration, a molding for an automobile having excellent high-temperature rubber elasticity (sealing performance) is obtained. Specifically, the results of measurement by a method in conformity with JIS K 6262 reveal that a compression set of 50% or less is achieved.

SUMMARY OF INVENTION

Technical Problem

However, in JP-A-2005-171190, the sealing performance is measured and evaluated by a method in conformity with JIS K 6262. The JIS K 6262 provides a method for measuring the compression set by using a flat plate-shaped sample (specimen). However, the value obtained by the measurement in a flat plate shape is sometimes different from the result of measuring the compression set in an actual product shape. Accordingly, when the sealing performance is measured and evaluated only in a flat plate shape, although a given quality may be guaranteed at the material level, the quality (sealing performance) is not necessarily guaranteed at the actual product level.

The present invention has been made to solve the problem above and provides a resin molded article for sealing, which can guarantee the sealing performance in a shape assuming an actual product.

Solution to Problem

The present invention is a resin molded article for sealing, including a main body part mounted to a mounted member and at least one seal part. The seal part has a cantilever shape or a hollow tubular shape extending from the main body part and, in a state of being mounted to the mounted member, is in resilient contact (press contact in a resiliently deformed state) with the mounted member or a mating member of the mounted member. The seal part is molded from a thermoplastic elastomer containing at least an olefin block copolymer.

It is preferable that the thermoplastic elastomer forming the seal part contains the olefin block copolymer in an amount of 25 wt % or more.

The thermoplastic elastomer forming the seal part may also contain a dynamically crosslinked olefin-based elastomer in addition to the olefin block copolymer.

Advantageous Effects of Invention

The seal part is molded from a thermoplastic elastomer containing at least an olefin block copolymer, so that excellent sealing performance (compression set) can be secured even when measured in a shape assuming an actual product.

DESCRIPTION OF EMBODIMENTS

The resin molded article for sealing is a seal member for ensuring liquid tightness, airtightness, sound insulation, dust resistance, etc. of a mounted member or a mating member of the mounted member. Such a resin molded article for sealing is not particularly limited in its specific shape as long as it includes a main body part configured to be mounted to a mounted member and at least one seal part, and the seal part has a cantilever shape or a hollow tubular shape extending from the main body part, and in a state of being mounted on a mounted member, is in press contact in a resiliently deformed state to the mounted member or a mating member of the mounted member.

The seal member includes, for example, a known seal member generally used heretofore in various structures, machine products, etc. and can be used. For example, the seal member can be used as a seal member of an automobile, a building, etc. Specific examples thereof include a weather strip for an automobile, a vehicle trim member, a vehicle molding, a joint member used as a building material and the like.

Figure 1:
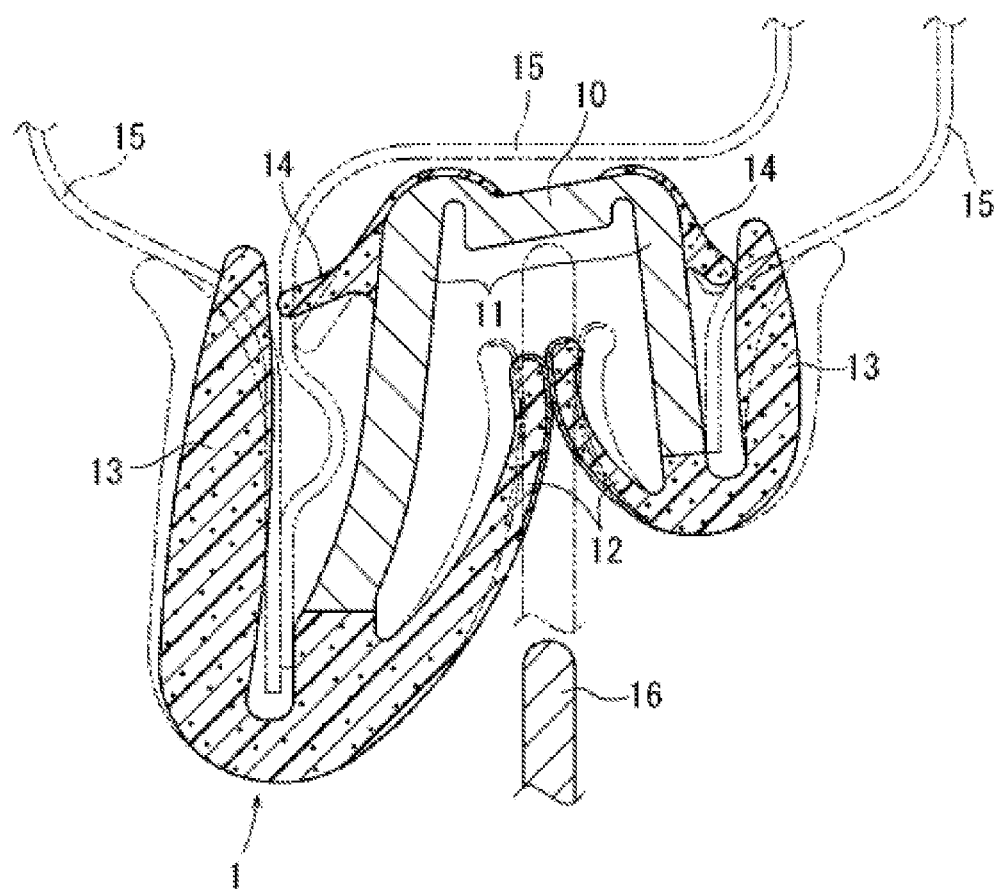
FIG. 1 is a cross-sectional view of a glass run channel.

The glass run channel 1 illustrated in FIG. 1 is a type of a weather strip. The glass run channel 1 is a long member. The glass run channel 1 has a U-shaped main body part. The main body part includes a bottom wall 10 and right and left lateral walls 11 erected integrally from right and left lateral edges of the bottom wall 10. At an inner edge of each distal end of both lateral walls 11, a cantilever-shaped seal lip 12 being folded back and extending toward the bottom wall 10 side is formed. At an outer edge of each distal end of both lateral walls 11, a cantilever-shaped decorative lip 13 being folded back and extending toward the bottom wall 10 side is formed. On an outer surface of each connection part of the bottom wall 10 and both lateral walls 11, a cantilever-shaped holding lip 14 protruding outward is formed. Each of these seal lips 12, decorative lips 13 and holding lips 14 correspond to the seal part.

The glass run channel 1 is a member arranged along a window frame of an automobile. The glass run channel 1 is mounted to a door panel 15 serving as the mounted member.

At this time, the decorative lips 13 and the holding lips 14 are in resilient contact with the door panel 15. When a window glass 16 is fully closed, the seal lips 12 are in resilient contact with the window glass 16.

Figure 2:
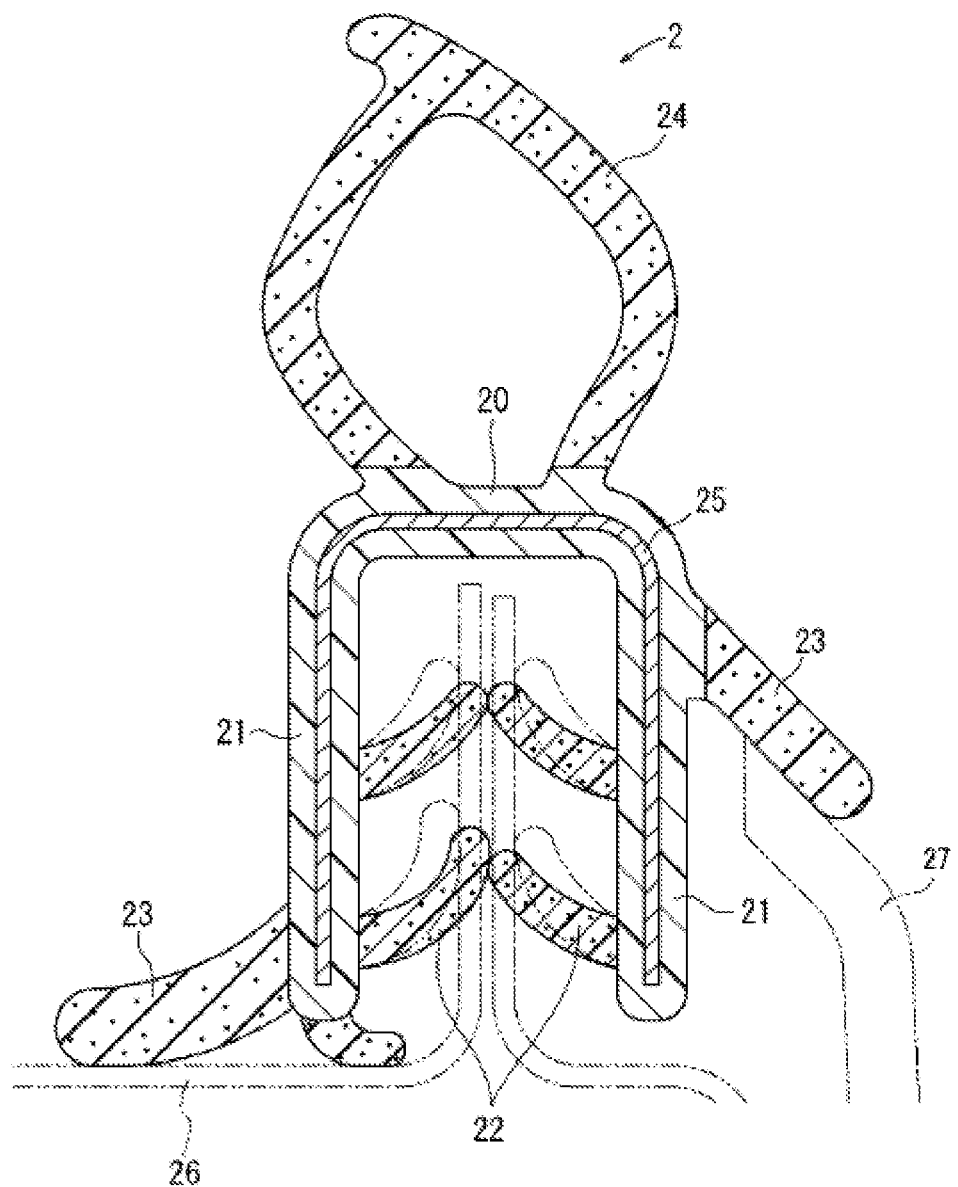
FIG. 2 is a cross-sectional view of a back door opening trim.

The vehicle trim member is a long member. The vehicle trim member includes, for example, a back door opening trim, a door opening trim, and a sunroof trim. The back door opening trim 2 illustrated in FIG. 2 has a U-shaped main body part. The main body part includes a top wall 20 and right and left lateral walls 21 erected integrally from right and left lateral edges of the top wall 20. The reference numeral 25 denotes a metal-made core material for retaining the shape of the main body part. On each inner surface of both lateral walls 21, a cantilever-shaped holding lip 22 is formed. As the holding lip 22, on each inner surface of both lateral walls 21, one lip or a plurality of lips (in FIG. 2, two lips) are formed in the height direction. On each outer surface of both lateral walls 21, a cantilever-shaped decorative lip 23 is formed to protrude. On the outer surface of the top wall 20, a hollow tubular-shaped seal part 24 is formed. Each of the holding lips 22, decorative lips 23 and a hollow tubular-shaped seal part 24 correspond to the seal part.

The back door opening trim 2 is a member arranged along the periphery of a door opening part of an automobile. The back door opening trim 2 is mounted to a car body panel 26 serving as the mounted member. At this time, the holding lips 22 are in resilient contact with the car body panel 26. At the same time, the decorative lip 23 is in resilient contact with an interior member 27. When a vehicle door (not shown) is closed, the seal part 24 is in resilient contact with the vehicle door serving as the mating member.

Figure 3:
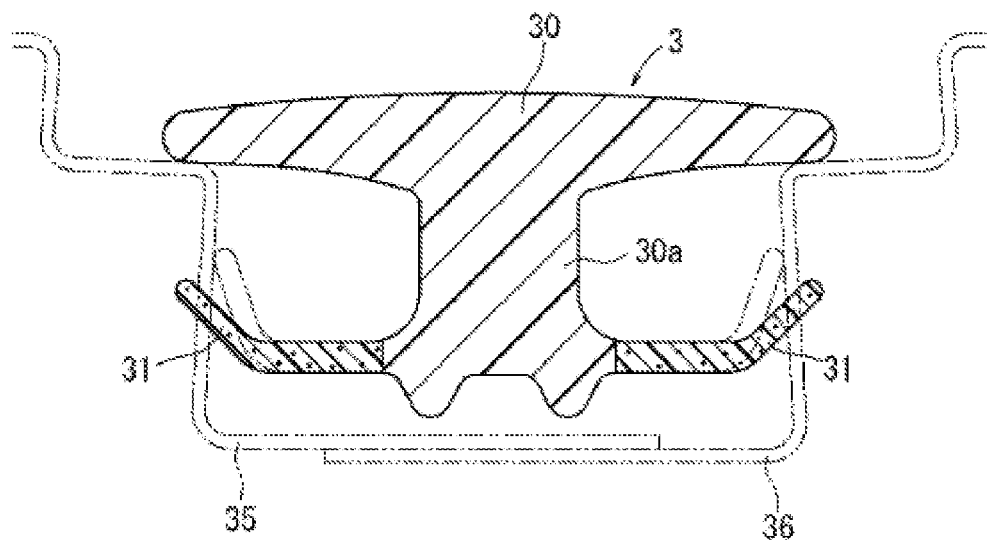
FIG. 3 is a cross-sectional view of a roof molding.

The vehicle molding is also a long member. The vehicle molding includes, for example, a roof molding, a door molding, and a window molding. The roof molding 3 illustrated in FIG. 3 includes a main body part 30 and a seal lip 31. The main body part 30 is T-shaped. The seal lips 31 are formed to protrude respectively right and left outward from the outer surface of the lower end part of the pillar part 30a of the main body part 30. The seal lips 31 correspond to the seal part. The roof molding 3 is mounted in a roof groove formed by a roof panel 35 and a side panel 36 each serving as the mounted member. In the state where the roof molding 3 is mounted in the roof groove, the seal lips 31 are in resilient contact with the roof panel 35 and the side panel 36.

Figure 4:
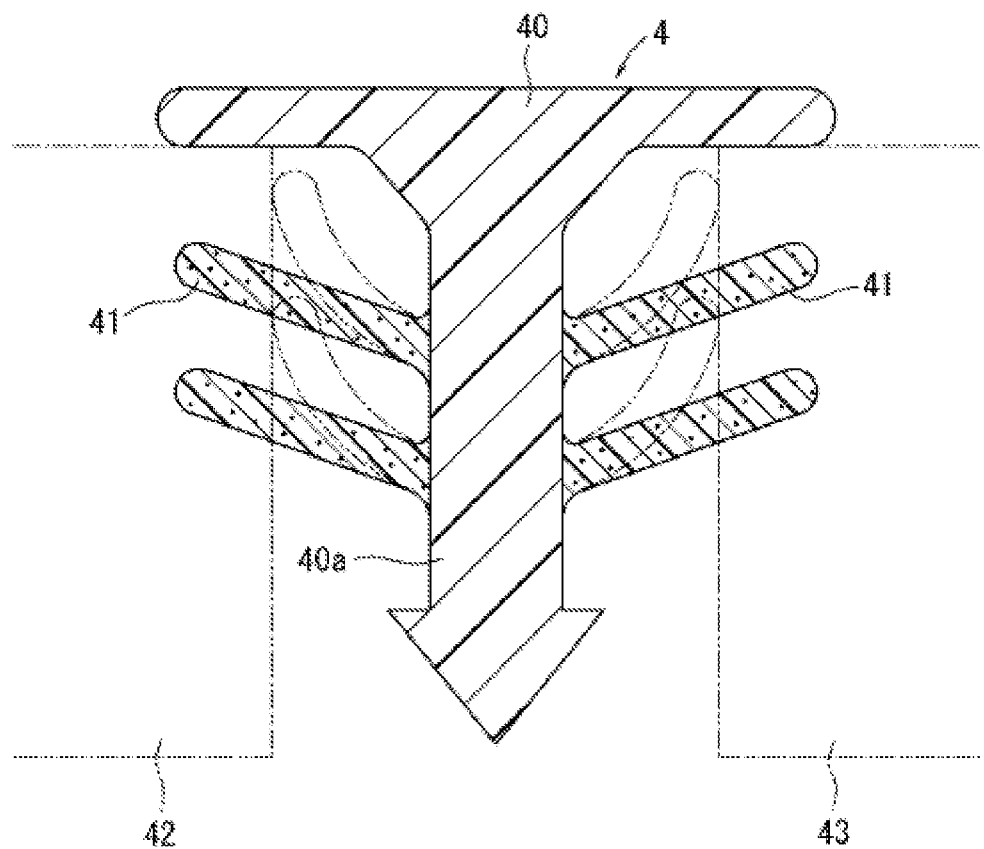
FIG. 4 is a cross-sectional view of a joint member.

The joint member includes those having a wide variety of shapes used for various applications. As an example, a joint member 4 illustrated in FIG. 4 has a main body part 40 and a seal lip 41. The main body part 40 is T-shaped. The seal lips 41 are formed to protrude respectively right and left outward from the outer surface of the pillar part 40a of the main body part 40. As the seal lip 41, one lip or a plurality of lips (in FIG. 4, two lips) are formed in the height direction. The joint member 4 is mounted to a joint formed by outer wall panels 42 and 43 each serving as the mounted member. In the state where the joint member 4 is mounted to the joint, the seal lips 41 are in resilient contact with the outer wall panels 42 and 43.

The above-described various seal members are a resin molded article obtained by extrusion molding or injection molding of a thermoplastic elastomer, a thermoplastic resin, etc. In particular, each seal part is molded from a thermoplastic elastomer containing at least an olefin block copolymer. The olefin block copolymer is a block copolymer including a crystalline polymer block (hard segment) mainly composed of ethylene and an amorphous polymer block (soft segment) containing 1-octene and ethylene (the ethylene content is smaller than that in the hard segment). In addition, the olefin block copolymer is a multiblock copolymer in which two or more, preferably three or more, blocks are alternately connected. The ethylene content in the olefin block copolymer is preferably from 25 to 97 mass %, more preferably from 40 to 96 mass %, still more preferably from 55 to 95 mass %. Such an olefin block copolymer includes, for example, "INFUSE D9000", "INFUSE 9100" and "INFUSE 9530" produced by The Dow Chemical Company.

The content of the olefin block copolymer in the thermoplastic elastomer forming the seal part is preferably 25 wt % or more, more preferably 30 wt % or more, still more preferably 35 wt % or more. The reason is because, if the content of the olefin block copolymer is too small, good sealing performance cannot be secured.

The seal part may be formed of only the olefin block copolymer. Accordingly, the upper limit of the olefin block copolymer content in the seal part is 100 wt %. In the case of mixing other materials, a dynamically crosslinked olefin-based elastomer (TPV) is preferably used together. Even when a dynamically crosslinked olefin-based elastomer is used together with the olefin block copolymer, the sealing performance can be secured. Here, the dynamically crosslinked means to mix and crosslink respective materials for producing the olefin-based elastomer while heating and melting the materials.

In addition, if desired, a thermoplastic elastomer other than an olefin block copolymer and an olefin-based elastomer, and additives such as heat stabilizer, ultraviolet absorber and crosslinking agent may be added to the seal part.

The main body part in the resin molded article for sealing may be formed of a known material conventionally used in this kind of seal member. Specifically, the material includes a thermoplastic elastomer, a foamed thermoplastic elastomer, a thermoplastic resin, a foamed thermoplastic resin, foamed rubber, a solid rubber, etc. Incidentally, the main body part can also be formed of the same material as the seal part. In the case where the material of the main body part is different from that of the seal part, a material having higher rigidity than that of the seal part is preferably used for the main body part, because the shape retention and mounting stability are enhanced.

The results of measuring and evaluating specific examples are described below.

(Material)

In each of Examples and Comparative Example, the following material was used.

Example 1: 100 wt % of an olefin block copolymer of "INFUSE D9000" (hereinafter, simply denoted as "INFUSE") produced by The Dow Chemical Company Example 2: 40 wt % of "INFUSE" and 60 wt % of a dynamically crosslinked olefin-based elastomer (TPV) of "SANTOPRENE" produced by Exxon Mobile Corporation Example 3: 25 wt % of "INFUSE" and 75 wt % of TPV Comparative Example 1: 100 wt % of TPV (Sample Shape)

Figure 5:
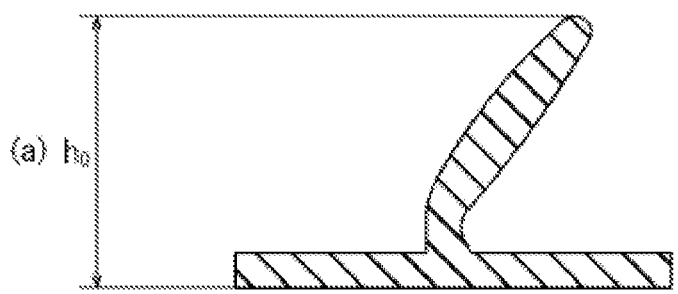
FIG. 5 is a test schematic diagram of a cantilever-shaped sample.
Figure 5:
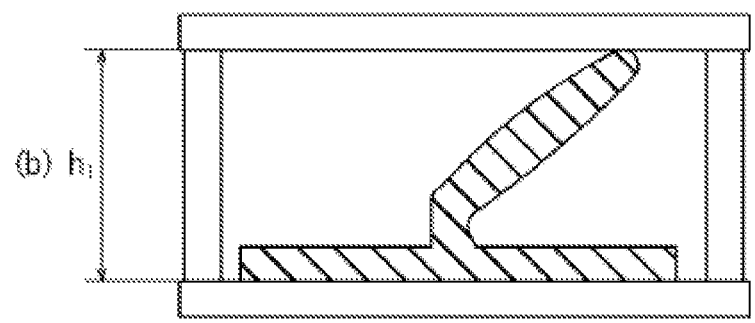
Figure 5:
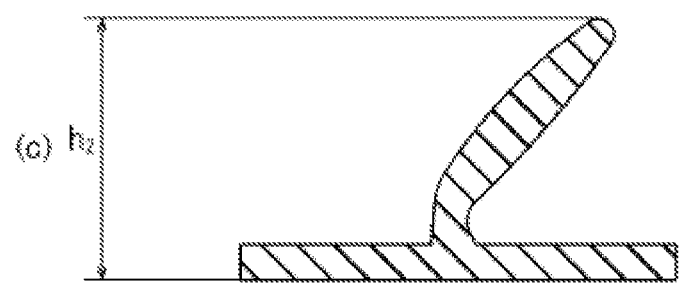

Sample shape A: Assuming a cantilever-shaped seal part, samples having a shape shown in (a) of FIG. 5 were prepared by extrusion molding using the materials of the Examples 1 to 3 and the Comparative Example 1.

Figure 6:
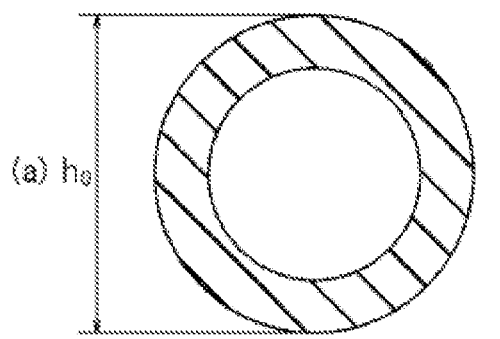
FIG. 6 is a test schematic diagram of a hollow tubular-shaped sample.
Figure 6:
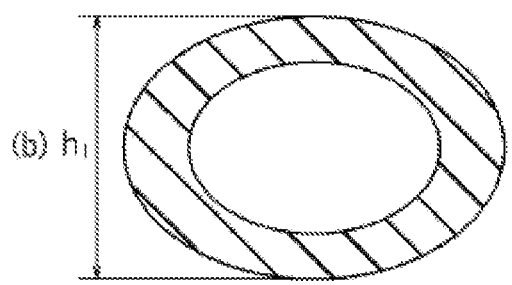
Figure 6:
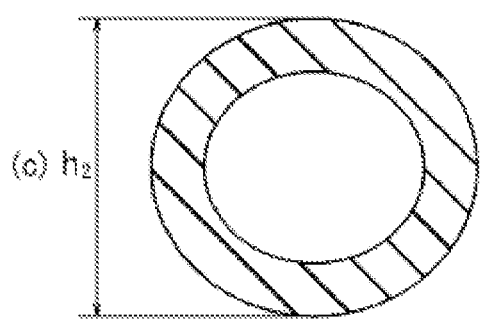

Sample shape B: Assuming a hollow tubular-shaped seal part, samples having a shape (outer diameter: 10 mm, wall thickness: 1.2 mm) shown in (a) of FIG. 6 were prepared by extrusion molding using the materials of the Examples 1 to 3 and the Comparative Example 1.

Sample shape C: Flat plate samples having a thickness of 2 mm and a width of 30 mm were prepared by extrusion molding using the materials of the Examples 1 to 3 and the Comparative Example 1 in conformity with JIS K 6262.

(Measurement of Compression Set)

Sample shape A: The height $h_0$ (see (a) of FIG. 5) of each sample in the initial state was measured, and each sample was then fixed to a jig as illustrated in (b) of FIG. 5 and held at 80° C. for 240 hours in the state of being compressed by 15% from the initial height $h_0$ (compression height $h_1$). After removing the jig, the return height $h_2$ (see (c) of FIG. 5) when the sample was left standing at room temperature (23° C.) for 30 minutes was measured, and the compression set (%) was calculated according to the following calculation formula (1).

$$\text{Compression set} = (h_0 - h_2)/(h_0 - h_1) \times 100 \quad (1)$$

$h_0$: initial height, $h_1$: compression height, $h_2$: return height

Sample shape B: The initial height $h_0$ (see (a) of FIG. 6) was measured, and each sample was then fixed to a jig as illustrated in (b) of FIG. 6 and held at 70° C. for 22 hours in the state of being compressed by 25% from the initial height $h_0$ (compression height $h_1$). After removing the jig, the return height $h_2$ (see (c) of FIG. 6) when the sample was left standing at room temperature (23° C.) for 30 minutes was measured, and the compression set (%) was calculated according to the calculation formula (1) in the same manner as in the sample shape A.

Sample shape C: After three sheets of the flat plate sample having a thickness of 2 mm and a width of 30 mm were stacked to make a thickness of 6 mm, the compression set was measured in conformity with JIS K 6262. Here, the measurement was performed at a temperature of 70° C.

(Test Results)

The measurement results of the compression set (%) obtained in each sample shape are shown in Table 1. A smaller value of the compression set is better.

TABLE 1

| | Sample Shape A | Sample Shape B | Sample Shape C |
|---|---|---|---|
| | | Test conditions | |
| | 80° C., 240 h | 70° C., 22 h | 70° C., 22 h |
| Example 1 | 46.7 | 34.0 | 37.9 |
| Example 2 | 43.9 | 30.3 | 34.7 |
| Example 3 | 47.5 | 35.8 | 35.0 |
| Comparative Example 1 | 64.3 | 44.9 | 34.3 |

(Review)

As shown in the results in Table 1, with respect to the sample shape C that is a flat plate shape in conformity with JIS K 6262, the compression set is more excellent in the Comparative Example 1 not using an olefin block copolymer than in the Examples 1 to 3 using an olefin block copolymer. On the other hand, with respect to the sample shapes A and B assuming an actual product, the compression set was more excellent in the Examples 1 to 3 using an olefin block copolymer than in the Comparative Example 1 not using an olefin block copolymer. From this, it was verified that the sealing performance of an actual product is not guaranteed by the measurement method in conformity with JIS K 6262, and at the same time, it was verified that when an olefin block copolymer is used in the seal part, excellent sealing performance can be secured also in the actual product.

The invention claimed is:

1. A resin molded article for sealing, comprising:
   a main body part configured to be mounted to a mounted member; and
   at least one seal part,
   wherein the seal part has a cantilever shape or a hollow tubular shape extending from the main body part and, in a state of being mounted to the mounted member, is in contact with the mounted member or a mating member of the mounted member, and
   wherein the seal part is molded from a thermoplastic elastomer consisting of an olefin block copolymer and a dynamically crosslinked olefin-based elastomer.

2. The resin molded article for sealing according to claim 1,
   wherein the thermoplastic elastomer forming the seal part contains the olefin block copolymer in an amount of 25 wt % or more.

* * * * *